United States Patent [19]

Sandstrom et al.

[11] Patent Number: 5,229,459
[45] Date of Patent: Jul. 20, 1993

[54] RUBBER STOCK CONTAINING HIGH TRANS POLYBUTADIENE

[75] Inventors: Paul H. Sandstrom, Tallmadge; Jerry L. Brenner; Eric C. Mizner, both of Copley, all of Ohio

[73] Assignee: The Goodyear Tire & Rubber Company, Akron, Ohio

[21] Appl. No.: 777,957

[22] Filed: Oct. 17, 1991

[51] Int. Cl.$^5$ .......................... C08L 9/00; C08L 9/06; C08L 7/00
[52] U.S. Cl. .................................. 525/136; 525/138; 525/139; 525/193; 525/194; 525/236; 525/237
[58] Field of Search ............... 525/236, 237, 136, 193, 525/194

[56] References Cited

U.S. PATENT DOCUMENTS

| | | | |
|---|---|---|---|
| 3,517,722 | 6/1970 | Endter et al. | 152/359 |
| 3,903,026 | 9/1975 | Fujimura et al. | 260/23.7 M |
| 3,993,847 | 11/1976 | Kondo | 428/451 |
| 4,310,582 | 1/1982 | Stumpe | 525/236 |
| 4,510,291 | 4/1985 | Kawakami | 525/237 |
| 4,669,518 | 6/1987 | Hargis et al. | 152/209 R |
| 4,719,266 | 1/1988 | Craig | 525/346 |
| 4,933,385 | 6/1990 | Yamamoto et al. | 524/105 |
| 5,049,618 | 9/1991 | Wideman et al. | 525/138 |

FOREIGN PATENT DOCUMENTS

| | | |
|---|---|---|
| 870053 | 5/1971 | Canada. |
| 0418188 | 3/1991 | European Pat. Off.. |
| 1-242642 | 9/1989 | Japan. |

OTHER PUBLICATIONS

Database WPIL, Section Ch, Week 8546, Derwent Publications Ltd., London, Great Britain; Class A, AN 85-287198 and JP-A-60 197 749 (Asahi Chemical Ind KK) 7 Oct. 1985.

*Primary Examiner*—Carman J. Seccuro, Jr.
*Attorney, Agent, or Firm*—Bruce J. Hendricks

[57] ABSTRACT

The present invention relates to a rubber stock comprising
(A) based on 100 parts by weight of rubber (1) from about 5 to about 15 weight percent of a trans 1,4-polybutadiene rubber wherein at least 65 percent of its butadiene repeat units are a trans 1,4-isomeric structure; and (2) from about 50 to about 95 weight percent of cis 1,4-polyisoprene, and (3) from about 0 to about 30 weight percent of the rubber selected from the group consisting of styrene-butadiene rubber, medium vinyl polybutadiene rubber wherein from about 40 to about 60 percent of its butadiene repeat units are a 1,2-vinyl isomeric structure and a cis 1,4-polybutadiene rubber wherein at least 90 percent of its butadiene repeat units are a cis 1,4-isomeric structure; (B) from about 0.1 to about 10 phr of a methylene acceptor; and (C) from about 0.1 to about 10 phr of a methylene donor.

16 Claims, No Drawings

RUBBER STOCK CONTAINING HIGH TRANS POLYBUTADIENE

BACKGROUND OF THE INVENTION

Many rubber articles, principally automobile tires, hoses, belts and the like are known as composites and are reinforced with fibers or wires. In all such instances, the fiber or wire must be firmly bonded to the rubber.

A frequent problem in making a rubber composite is maintaining good adhesion between the rubber and the reinforcement. A conventional method in promoting the adhesion between the rubber and the reinforcement is to pretreat the reinforcing fiber with a mixture of a rubber latex and a phenol-formaldehyde condensation product wherein the phenol is almost always resorcinol. This is the so-called "RFL" (resorcinol- formaldehyde-latex) method. An alternative method of promoting such adhesion is to generate the resin in-situ (in the vulcanized rubber/textile matrix) by compounding a phenol-formaldehyde condensation product (hereinafter referred to as the "in-situ method"). The components of the condensation product consist of a methylene acceptor and a methylene donor. The most common methylene donors include N-(substituted oxymethyl) melamine, hexamethylene tetramine or hexamethoxy methyl melamine. A common methylene acceptor is a dihydroxy benzene compound such as resorcinol. The in-situ method has been found to be fairly effective where the reinforcing material is steel wire since pretreatment of the wire with the RFL system has been observed as being largely ineffective. Unfortunately, the products using the in-situ method has still fallen short of the demands of the consumer.

The purpose of the present invention is to further improve the adhesion between the fiber or wire reinforcement and its rubber environment to satisfy this shortcoming in the existing technology.

SUMMARY OF THE INVENTION

The present invention relates to rubber stocks particularly suited for wire coat compounds and ply coat compounds for use in tires. The rubber stock of the present invention may also be used in a number of applications including hoses and belts. The rubber stock of the present invention is characterized by having two or more diene rubbers. At least one of the diene rubbers is a polybutadiene rubber in which the content of trans 1,4-bonds is at least 65 weight percent. The rubber stock also contains a methylene acceptor and methylene donor.

DETAILED DESCRIPTION OF THE PREFERRED EMBODIMENT

There is disclosed a rubber stock comprising
(A) based on 100 parts by weight of rubber
 (1) from about 5 to about 15 weight percent of a trans 1,4-polybutadiene rubber wherein at least 65 weight percent of its butadiene repeat units are a trans 1,4-isomeric structure; and
 (2) from about 50 to about 95 weight percent of cis 1,4-polyisoprene, and
 (3) from about 0 to about 30 weight percent of a rubber selected from the group consisting of styrene-butadiene rubber, medium vinyl polybutadiene rubber wherein from about 40 to about 60 percent of its butadiene repeat units are a 1,2-vinyl isomeric structure and cis 1,4-polybutadiene rubber wherein at least 90 percent of its butadiene repeat units are a cis 1,4-isomeric structure;
(B) from about 0.1 to about 10 phr of a methylene acceptor; and
(C) from about 0.1 to about 10 phr of a methylene donor.

The use of trans 1,4-polybutadiene has been disclosed for various purposes, including, for example, tire tread compounds and increasing green strength of rubber mixtures (see Japanese Patent Publication No. 60-133,036; 62-101,504; and 6-143,453) and U.S. Pat. No. 4,510,291. The trans 1,4-polybutadiene for use in the present invention has at least 65 percent of its butadiene repeat units in a trans 1,4-isomeric structure. Generally speaking, the percent of 1,4-structure ranges from about 65 to 90 percent, with about 20 to 5 percent of its butadiene repeat units of a vinyl 1,2-structure and 15 to 2 percent of its butadiene repeat units in a cis 1,4-structure. Preferably, the trans 1,4-polybutadiene is characterized by having about 75 to an 85 weight percent of its butadiene repeat units in a trans 1,4-isomeric structure, about 12 to 18 percent of its butadiene repeat units in a vinyl 1,2-structure and 3 to about 8 percent of its butadiene repeat units in a cis 1,4-structure. In its uncured state, the trans 1,4-polybutadiene exhibits two distinct melting points, a major melting point and a minor melting point. The first major melting point is in the range of from about 35° C. to about 45° C. and the second major melting point is in the range of from about 55° C. to about 65° C. Preferably, the first and second melting points are separated by at least 15° C. and usually about 20° C.

Trans 1,4-polybutadiene is normally prepared utilizing transition metal catalysts or rare earth catalysts. The synthesis of trans 1,4-polybutadiene with transition metal catalysts is described by J. Boor, Jr., "Ziegler-Natta Catalysts and Polymerizations", Academic Press, New York, 1979, Chapters 5-6. The synthesis of trans 1,4-polybutadiene with rare earth metal catalysts is described by D. K. Jenkins, Polymer, 26 144 (1985). The trans 1,4-polybutadiene can be prepared by anionic polymerization by batch polymerizing 1,3-butadiene in an organic solvent and in the presence of cobalt octoate and triethyl aluminum as a catalyst system with a para-alkyl substituted phenol as a catalyst modifier.

The weight percent of the trans 1,4-polybutadiene comprises from about 5 to about 15 weight percent of the total rubber in the rubber stock.

From about 50 to about 95 weight percent of the total rubber in the rubber stock is cis 1,4-polyisoprene. The cis 1,4-polyisoprene may be natural rubber, synthetic cis 1,4-polyisoprene, or mixtures thereof.

While it is essential that the rubber stock contain a trans 1,4-polybutadiene component and a cis 1,4-polyisoprene rubber, the rubber may optionally contain a third rubber component comprising from about 0 to about 30 weight percent of styrene-butadiene rubber, a medium vinyl polybutadiene rubber wherein from about 40 to about 60 percent of its butadiene repeat units are a 1,2-vinyl isomeric structure and a cis 1,4-polybutadiene rubber wherein at least 90 percent of its butadiene repeat units are a cis 1,4-isomeric structure. Preferably, the rubber blend contains from about 0 to about 15 of this third rubber component.

According to an embodiment of the present invention, the rubber stock contains a "methylene donor" and a "methylene acceptor". The term "methylene acceptor" is known to those skilled in the art and is used to describe the reactant to which the methylene donor reacts to form what is believed to be a methylol monomer. The condensation of the methylol monomer by the formation of a methylene bridge produces the resin. The initial reaction that contributes the moiety that later forms into the methylene bridge is the methylene donor wherein the other reactant is the methylene acceptor. Representative of those compounds which may be used as a methylene acceptor include resorcinol and hydroxyphenylmonomaleimides of the formula:

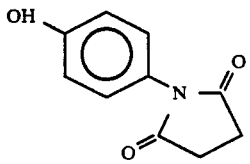

Use of the hydroxyphenylmaleimides of the above formula is disclosed in U.S. patent application Ser. No. 402,724, filed Sep. 5, 1989, which is incorporated by reference herein in its entirety. The amount of methylene acceptor that is included in the rubber stock may vary depending on the type of rubber, the particular methylene acceptor, the particular methylene donor and the desired physical properties, i.e., adhesion and tear. Generally speaking, the amount of methylene acceptor may range from about 0.1 to about 10 phr. Preferably, the amount of methylene acceptor ranges from about 0.5 to about 5.0 phr.

The rubber stock of the present invention contains a methylene donor which is suitable for reaction with the methylene acceptor. Examples of methylene donors which are suitable for use in the present invention include hexamethylenetetramine, hexaethoxymethylmelamine, hexamethoxymethylmelamine, lauryloxymethoxypyridinium chloride, ethoxymethylpyridinium chloride, trioxan hexamethoxymethylmelamine, the hydroxy groups of which may be esterified or partially esterified. In addition the methylene donors may be N-substituted oxymethylmelamines of the formula:

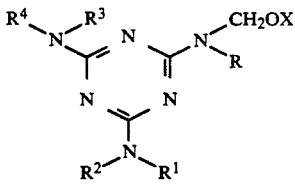

wherein X is an alkyl having from 1 to 8 carbon atoms, R, $R^1$, $R^2$, $R^3$, and $R^4$ are individually selected from the group consisting of hydrogen, an alkyl having from 1 to 8 carbon atoms, the group —CH$_2$OX or their condensation products. Specific methylene donors include hexakis-(methoxymethyl)melamine, N,N',N"-trimethyl/N,-N',N"-trimethylolmelamine, hexamethylolmelamine, N,N',N"-dimethylolmelamine, N-methylolmelamine, N,N'-dimethylolmelamine, N,N',N"'-tris(methoxymethyl)melamine and N,N'N"'-tributyl-N,N',N"-trimethylol-melamine. The N-methylol derivatives of melamine are prepared by known methods.

The amount of methylene acceptor that is present in the rubber stock may vary depending on the type of rubber, the particular methylene acceptor, the particular methylene donor and the desired physical properties, i.e., adhesion and tear. Generally speaking, the amount of methylene donor may range from about 0.1 to about 10 phr. Preferably, the amount of methylene donor ranges from about 0.5 to about 5.0 phr.

The weight ratio of methylene donor to methylene acceptor can vary. Generally speaking, the weight ratio will range from about 1:10 to about 10:1. Preferably, the weight ratio ranges from about 1:3 to 3:1.

When the rubber stock of the present invention is to be used in wire coat applications, the rubber stock may contain conventional cobalt compounds known to those skilled in the art. These rubber stocks may contain conventional amounts of a cobalt compound, ranging from about 0.1 to about 4 phr. Examples of compounds which may be used include the cobalt salts, cobalt naphthanate, cobalt linoleate, cobalt stearate, cobalt oleate, cobalt acetate, cobalt neodecanoate, cobalt tallate, cobalt resinate, cobalt acetonate, or in situ salts prepared from cobalt hydroxide and an organic acid such as naphthenic acid, stearic acid, oleic acid, acetic acid, linoleic acid and the like. Additional cobalt compounds which may be used are known under the tradename Manoband TM C. Manoband TM C is a cobalt complex of an organic acid containing boron manufactured by Manchem Company. Manoband TM C is described in British Patent No. 972,804, which is incorporated by reference in its entirety. A particularly preferred amount of cobalt compound used in these rubber stocks range from about 0.5 to about 3 phr.

As known to one skilled in the art, in order to cure a rubber stock, one needs to have a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. The amount of sulfur vulcanizing agent will vary depending on the components of the rubber stock and the particular type of sulfur vulcanizing agent that is used. Generally speaking, the amount of sulfur vulcanizing agent ranges from about 0.1 to about 8 phr with a range of from about 1.5 to about 6 being preferred.

Conventional rubber additives may be incorporated in the rubber stock of the present invention. The presence of a sulfur vulcanizing agent and conventional additives are not considered to be an aspect of this invention which is primarily directed to the utilization of specified blends of rubbers with a cobalt salt in a rubber stock. The additives commonly used in rubber stocks include fillers, plasticizers, curatives, processing oils, retarders, antiozonants, antioxidants and the like. The total amount of filler that may be used may range from about 30 to about 80 phr, with a range of from about 45 to about 70 phr being preferred. Fillers include silicas, clays, calcium carbonate, calcium silicate, titanium dioxide and carbon black. HAF Black (N-330) and GPF-Black (N-660) are commonly used in rubber stocks intended for use as wire coats or carcass ply coats. Preferably, at least a portion of the filler is carbon black. Plasticizers are conventionally used in amounts ranging from about 2 to about 50 phr with a range of about 5 to about 30 phr being preferred. The amount of plasticizer used will depend upon the softening effect desired. Examples of suitable plasticizers include aromatic extract oils, petroleum softeners including asphaltenes, saturated and unsaturated hydrocarbons and nitrogen bases, coal tar products, cumarone-indene resins and esters such as dibutylphthalate and tricresyl phosphate.

Materials used in compounding which function as an accelerator-activator includes metal oxides such as zinc oxide, magnesium oxide and litharge which are used in conjunction with acidic materials such as fatty acid, for example, stearic acid, oleic acid, murastic acid, and the like. The amount of the metal oxide may range from about 1 to about 10 phr with a range of from about 2 to about 8 phr being preferred. The amount of fatty acid which may be used may range from about 0.25 phr to about 5.0 phr with a range of from about 0.5 phr to about 2 phr being preferred.

Accelerators may be used to control the time and/or temperature required for vulcanization of the rubber stock. As known to those skilled in the art, a single accelerator may be used which is present in amounts ranging from about 0.2 to about 2.0 phr. In the alternative, combinations of two or more accelerators may be used which consist of a primary accelerator which is generally used in a larger amount (0.3 to about 2.0 phr), and a secondary accelerator which is generally used in smaller amounts (0.05 to about 0.50 phr) in order to activate and improve the properties of the rubber stock. Combinations of these accelerators have been known to produce synergistic effects on the final properties and are somewhat better than those produced by use of either accelerator alone. Delayed action accelerators also are known to be used which are not affected by normal processing temperatures and produce satisfactory cures at ordinary vulcanization temperatures. Suitable types of accelerators include amines, disulfides, guanidines, thioureas, thiazoles, thiurams, sulfenamides, dithiocarbamates and the xanthates. Examples of specific compounds which are suitable include zinc diethyl-dithiocarbamate, 4,4'-dithiodimorpholine, N,N-dimethyl-S-tertbutylsulfenyldithiocarbamate, tetramethylthiuram disulfide, 2,2'-dibenzothiazyl disulfide, butyraldehydeaniline mercaptobenzothiazole, N-oxydiethylene-2-benzothiazolesulfenamide and N-cyclohexyl-2-benzothiazolesulfenamide. Preferably, the accelerator is a sulfenamide.

A class of compounding materials known as scorch retarders are commonly used. Phthalic anhydride, salicyclic acid, sodium acetate and N-cyclohexyl thiophthalimide are known retarders. Retarders are generally used in an amount ranging from about 0.1 to 0.5 phr.

Preformed phenol-formaldehyde type resins may be used in the rubber stock and are generally present in an amount ranging from about 1.0 to about 5.0 phr, with a range of from about 1.5 to about 3.5 phr being preferred.

Conventionally, antioxidants and some times antiozonants, hereinafter referred to as antidegradants, are added to rubber stocks. Representative antidegradants include monophenols, bisphenols, thiobisphenols, polyphenols, hydroquinone derivatives, phosphites, thioesters, naphthyl amines, diphenyl-p-phenylenediamines, diphenylamines and other diaryl amine derivatives, para-phenylenediamines, quinolines and mixtures thereof. Specific examples of such antidegradants are disclosed in The Vanderbilt Rubber Handbook (1990), pages 282-286. Antidegradants are generally used in amounts from about 0.25 to about 5.0 phr with a range of from about 1.0 to about 3.0 phr being preferred.

The rubber stock of the present invention has a particular utility in a composite with reinforcing material as a wire coat stock or ply coat stock. Examples of such composites include tires, belts or hoses. In particular, the rubber stock of the present invention has utility as a wire coat stock or ply coat stock for use in tires.

The present invention may be better understood by reference to the following example in which the parts or percentages are by weight unless otherwise indicated.

EXAMPLE

Mixtures of diene rubbers and trans 1,4-polybutadiene rubber were prepared comprised of the following recipe shown in Table I as Samples 2–4. Sample 1 (without trans 1,4-polybutadiene is considered a control). The trans 1,4-polybutadiene had two softening points of about 40° C. and 60° C. The trans 1,4-polybutadiene had a trans 1,4-content of 80 percent of its total butadiene repeat units, a cis 1,4-content of about 5 percent and a vinyl 1,2-content of about 15 percent. The trans 1,4-polybutadiene was further characterized by having a number average molecular weight (Mn) of about 205,000 and a weight average molecular weight (Mw) of about 430,000. The trans 1,4-polybutadiene had a Tg of about −75° C.

TABLE I

| | Control Sample 1 | Sample 2 | Sample 3 | Sample 4 |
|---|---|---|---|---|
| cis 1,4-polyisoprene | 100 | 95.0 | 90.0 | 85.0 |
| Trans Polybutadiene | 0 | 5.0 | 10.0 | 15.0 |
| Methylene Donor[1] | 2.8 | 2.8 | 2.8 | 2.8 |
| Methylene Acceptor[2] | 2.0 | 2.0 | 2.0 | 2.0 |

[1]Hexamethoxymethylmelamine on calcium silicate carrier
[2]Resorcinol

In addition to the ingredients listed in Table I each sample contained the same amount of conventional carbon black, processing oil, retarder, antioxidant, cobalt salt, sulfur, oleic acid and accelerators.

Each sample was cured at a temperature of about 50° C. for about 20 minutes and the resulting cured rubber samples evaluated for their physical properties are shown in the following Table II.

TABLE II

| | Control Sample 1 | Sample 2 | Sample 3 | Sample 4 |
|---|---|---|---|---|
| Green Strength (Newtons) | | | | |
| 40% | 4.2 | 5.4 | 6.6 | 13.0 |
| 80% | 6.3 | 6.0 | 9.0 | 19.6 |
| 120% | 4.5 | 6.2 | 11.4 | 27.0 |
| 200% | 3.9 | 6.3 | 13.2 | 37.8 |
| 320% | 3.5 | 6.6 | 12.5 | 25.2 |
| Break Strength | 3.6 | 11.7 | 12.6 | 26.1 |
| % Elongation at Break | 790 | 935 | 800 | 385 |
| Rheometer | | | | |
| t25 (min.) | 8.3 | 8.4 | 8.8 | 9.0 |
| t90 (min.) | 19.8 | 20.7 | 21.9 | 23.1 |
| T max. (min.) | 53.7 | 54.7 | 55.3 | 55.5 |
| T min. (min.) | 8.2 | 9.2 | 10.0 | 10.4 |
| 300% Modulus (MPa) | 13.5 | 13.4 | 13.4 | 13.5 |
| Break Strength (MPa) | 19.2 | 17.4 | 18.0 | 18.6 |
| Peel Adhesion at 95° C. (Newtons per in.) | 52 | 47 | 37 | 41 |
| SWAT | | | | |
| 10 days at 95% relative humidity at 75° C. | 584 | 530 | 637 | 607 |
| 10 days, H2O at 90° C. | 395 | 473 | 559 | 541 |

Cure properties were determined using a Monsanto oscillating disc rheometer which was operated at a temperature of 150° C. at a frequency of 11 hertz. A description of oscillating disc rheometers can be found in the Vanderbilt Rubber Handbook edited by Robert O. Babbit, Norwalk, Conn., R. T. Vanderbilt Company, Inc., 1990 (pages 554-557). The use of this cure meter in standardized values read from the curve are specified in ASTM D2084. Typical curves obtained on an oscillating disc rheometer are shown on page 555 of the 1990 edition of the Vanderbilt Rubber Handbook.

In such an oscillating disc rheometer, compounded rubber samples are subjected to an oscillating shearing action of constant amplitude. The torque of the oscillating disc embedded in the stalk that is being tested that is required to oscillate the rotor at the vulcanization temperature is measured. The values obtained using this cure test are very significant since changes in the rubber or the compounding recipe are very readily detected.

Table II reports cure properties that were determined from cure curves that are obtained for the various rubber formulations which were prepared. These properties include a torque minimum (T min.), a torque maximum (T max.), minutes to 25 percent of the torque increase (t25), and minutes to 90 percent of the torque increase (t90).

Peel adhesion testing was done to determine the interfacial adhesion between the rubber stocks that were prepared. The interfacial adhesion was determined by pulling one compound away from another at a right angle to the untorn test specimen with the two ends being pulled apart at 180° angle to each other using an Instron machine. The area of contact was determined from placement of a Mylar sheet between the compounds during cure. A window in the Mylar allowed the two materials to come into contact with each other during testing.

Table II lists the physical properties for Samples 1, 2, 3 and 4. As can be seen above, significant improvements are achieved in SWAT values (aged) by use of small amounts of high trans polybutadiene.

What is claimed is:

1. A rubber stock for wirecoat compounds and plycoat compounds comprising
(A) based on 100 parts by weight of a rubber
   (1) from about 5 to about 15 weight percent of a trans 1,4-polybutadiene rubber wherein at least 65 percent of its butadiene units are a trans 1,4-isomeric structure; and
   (2) from about 55 to about 95 weight percent of cis 1,4-polyisoprene, and
   (3) from about 0 to about 30 weight percent of a rubber selected from the group consisting of styrene-butadiene rubber, medium vinyl polybutadiene rubber wherein from about 40 to about 60 percent of its butadiene repeat units are a 1,2-vinyl isometric structure and cis 1,4-polybutadiene rubber wherein at least 90 percent of its butadiene repeat units are a cis 1,4-isometric structure; and
(B) from about 0.1 to about 10 phr of a methylene acceptor; and
(C) from about 0.1 to about 10 phr of a methylene donor.

2. The rubber stock of claim 1 wherein trans 1,4-polybutadiene rubber having from about 65 to 90 percent of its butadiene repeating units in a trans 1,4-isomeric structure is used.

3. The rubber stock of claim 1 wherein said methylene acceptor is selected from the group consisting of resorcinol, a monomaleimide of the formula:

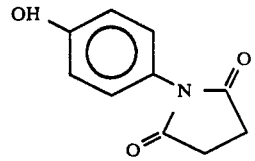

or mixtures thereof.

4. The rubber stock of claim 1 wherein the methylene donor is selected from the group consisting of hexamethylene tetramine, hexamethoxymethyl melamine, lauryloxymethyl pyridinium chloride, ethyloxymethyl pyridinium chloride, trioxan hexamethylolmelamine and paraformaldehyde.

5. The rubber stock of claim 1 wherein the methylene donor is of the general formula:

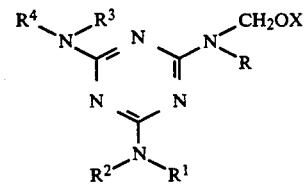

wherein X is an alkyl having from 1 to 8 carbon atoms, R, $R^1$, $R^2$, $R^3$, and $R^4$ are individually selected from the group consisting of hydrogen, an alkyl having from 1 to 8 carbon atoms, the group —$CH_2OX$ or their condensation products.

6. The rubber stock of claim 1 wherein the methylene donor is selected from the group consisting of hexakis(methoxymethyl)melamine, N,N',N"-trimethyl/N,N',N"-trimethylolmelamine, hexamethylolmelamine, N,N',N"-dimethylolmelamine, N-methylolmelamine, N,N'-,dimethylolmelamine, N,N',N"tris(methoxymethyl) melamine and N,N',N"tributyl-N,N',N"-trimethylolmelamine.

7. The rubber stock of claim 1 wherein the weight ratio of methylene donor to the methylene acceptor ranges from 1:10 to about 10:1.

8. The rubber stock of claim 7 wherein the weight ratio of methylene donor to methylene acceptor ranges from about 1:3 to about 3:1.

9. The rubber stock of claim 1 wherein from about 85 to 95 weight percent of a rubber selected from cis 1,4-polyisoprene or mixtures thereof is used.

10. The rubber stock of claim 1 wherein from about 0 to about 15 weight percent of a rubber selected from the group consisting of styrene-butadiene rubber, medium vinyl polybutadiene rubber and cis 1,4-polybutadiene rubber is used.

11. The rubber stock of claim 1 wherein from about 0.5 to about 5.0 phr of a methylene donor is used.

12. The rubber stock of claim 1 wherein the cis 1,4-polyisoprene is selected from the group consisting of natural rubber, synthetic cis 1,4-polyisoprene or mixtures thereof.

13. The rubber stock of claim 1 wherein the trans 1,4-polybutadiene in its uncured state, exhibits two distinct melting points.

14. The rubber stock of claim 13 wherein the first major melting point is in the range from about 35° C. to about 45° C.

15. The rubber stock of claim 13 wherein the second melting point is in the range of from about 55° to about 65° C.

16. The rubber stock of claim 13 wherein the first and second melting points are separated by at least 15° C.

* * * * *